United States Patent
Millington et al.

(10) Patent No.: US 9,247,492 B2
(45) Date of Patent: Jan. 26, 2016

(54) SYSTEMS AND METHODS FOR MULTI-NETWORK AUDIO CONTROL

(75) Inventors: Nicholas A. J. Millington, Santa Barbara, CA (US); Jeffrey Peters, Cambridge, MA (US); Michael Agerbak, Cambridge, MA (US); Steven R. Beckhardt, Boston, MA (US)

(73) Assignee: SONOS, INC., Santa Barbara, CA (US)

( * ) Notice: Subject to any disclaimer, the term of this patent is extended or adjusted under 35 U.S.C. 154(b) by 135 days.

(21) Appl. No.: 13/340,110

(22) Filed: Dec. 29, 2011

(65) Prior Publication Data

US 2013/0170363 A1    Jul. 4, 2013

(51) Int. Cl.
*H04L 12/28* (2006.01)
*H04W 48/18* (2009.01)
*H04W 76/02* (2009.01)

(52) U.S. Cl.
CPC .............. *H04W 48/18* (2013.01); *H04W 76/02* (2013.01)

(58) Field of Classification Search
None
See application file for complete search history.

(56) References Cited

U.S. PATENT DOCUMENTS

| | | | |
|---|---|---|---|
| 5,923,902 A | 7/1999 | Inagaki | |
| 6,256,554 B1 | 7/2001 | DiLorenzo | |
| 6,317,789 B1 | 11/2001 | Rakavy et al. | |
| 6,366,582 B1 | 4/2002 | Nishikado et al. | |
| 6,404,811 B1 | 6/2002 | Cvetko et al. | |
| 6,522,886 B1 | 2/2003 | Youngs et al. | |
| 6,611,537 B1 | 8/2003 | Edens et al. | |
| 6,631,410 B1 | 10/2003 | Kowalski et al. | |

(Continued)

FOREIGN PATENT DOCUMENTS

| | | |
|---|---|---|
| KR | 100794622 | 1/2008 |
| KR | 20110037680 | 4/2011 |
| WO | 0011908 | 3/2000 |
| WO | 0153994 | 7/2001 |
| WO | 2007067550 A2 | 6/2007 |

OTHER PUBLICATIONS

Bluetooth, "Specification of the Bluetooth System: The ad hoc SCATTERNET for affordable and highly functional wireless connectivity" Core, Version 1.0 A, Jul. 26, 1999, 1068 pages.(Document uploaded in 7 different files: NPL1_part1 pp. 1 to 150, NPL1_part2 pp. 151 to 300, NPL1_part3 pp. 301 to 450, NPL1_part4 pp. 451 to 600,NPL1_part5 pp. 601 to 750, NPL1_part6 pp. 751 to 900 and NPL1_part7 pp. 901 to 1068).

(Continued)

*Primary Examiner* — Chi H Pham
*Assistant Examiner* — Raul Rivas

(57) ABSTRACT

Systems, methods, apparatus, and articles of manufacture to facilitate connection to a multimedia playback network are disclosed. An example wireless device includes a wireless communication interface to identify a first network within range of the wireless device available for connection and to facilitate connection of the wireless device to the first network. The example wireless device includes a processor to add the first network to a registry of networks for connection by the wireless device. The example wireless device includes a signal strength monitor to monitor one or more available networks from the network registry that are within range of the wireless device. The example processor is to evaluate the available network(s) to identify a preferred network for connection based on at least one network characteristic and facilitate a switch from connection of the wireless device to the first network if the preferred network is different from the first network.

21 Claims, 13 Drawing Sheets

(56) References Cited

U.S. PATENT DOCUMENTS

| | | |
|---|---|---|
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,483,538 B2 | 1/2009 | McCarty et al. |
| 7,571,014 B1 | 8/2009 | Lambourne et al. |
| 7,643,894 B2 | 1/2010 | Braithwaite et al. |
| 7,657,910 B1 | 2/2010 | McAulay et al. |
| 7,668,925 B1 | 2/2010 | Liao et al. |
| 7,853,341 B2 | 12/2010 | McCarty et al. |
| 8,014,423 B2 | 9/2011 | Thaler et al. |
| 8,045,952 B2 | 10/2011 | Qureshey et al. |
| 8,050,203 B2 | 11/2011 | Jacobsen et al. |
| 8,103,009 B2 | 1/2012 | McCarty et al. |
| 8,234,395 B2 | 7/2012 | Millington |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2005/0135304 A1 | 6/2005 | Wentink et al. |
| 2006/0209785 A1 | 9/2006 | Iovanna et al. |
| 2006/0264227 A1* | 11/2006 | Takahashi et al. ............ 455/513 |
| 2007/0142944 A1 | 6/2007 | Goldberg et al. |
| 2008/0025535 A1 | 1/2008 | Rajapakse |
| 2008/0189359 A1 | 8/2008 | Sasaki et al. |
| 2010/0034393 A1 | 2/2010 | Sorek et al. |
| 2010/0275244 A1* | 10/2010 | Lor et al. ........................ 726/3 |
| 2011/0069720 A1 | 3/2011 | Jacobs et al. |
| 2011/0149768 A1 | 6/2011 | Kang et al. |
| 2011/0211511 A1* | 9/2011 | Bakthavathsalu et al. .... 370/311 |
| 2012/0093152 A1 | 4/2012 | Singh et al. |
| 2012/0147268 A1 | 6/2012 | Hassan et al. |
| 2013/0173794 A1 | 7/2013 | Agerbak et al. |
| 2013/0301429 A1 | 11/2013 | Peters et al. |

OTHER PUBLICATIONS

Bluetooth. "Specification of the Bluetooth System: Wireless connections made easy" Core, Version 1.0 B, Dec. 1, 1999, 1081 pages. (Document uploaded in 8 different files: NPL2_part1 pp. 1 to 150, NPL2_part2 pp. 151 to 303, NPL2_part3 pp. 304 to 453, NPL2_part4 pp. 454 to 603,NPL2_part5 pp. 604 to 703, NPL2_part6 pp. 704 to 854 and NPL2_part7 pp. 855 to 1005, NPL2_part8 pp. 1006 to 1081).

Dell, Inc., "Dell Digital Audio Receiver: Reference Guide" Jun. 2000, 70 pages.

Dell, "Start Here" Jun. 2000, 2 pages.

Jones, Stephen. "Dell Digital Audio Receiver: Digital upgrade for your analog stereo" Analog Stereo. Jun. 24, 2000 < http://www.reviewsonline.com/articles/961906864.htm> retrieved Jun. 18, 2014, 2 pages.

Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages.

Palm, Inc. "Handbook for the Palm VII Handheld" May 2000, 311 pages.

Higgins et al., "Presentations at WinHEC 2000" May 2000, 138 pages.

Voyetra Turtle Beach, Inc.,"AudioTron Quick Start Guide, Version 1.0", Mar. 2001, 24 pages.

Voyetra Turtle Beach, Inc.,"AudioTron Reference Manual, Version 3.0", May 2002, 70 pages.

Voyetra Turtle Beach, Inc., "AudioTron Setup Guide, Version 3.0", May 2002, 38 pages.

International Bureau, "International Search Report and Written Opinion", issued in connection with Application No. PCT/US2013/045643, mailed on Feb. 19, 2014, 14 pages.

International Bureau ,"International Search Report", issued in connection with PCT Application No. PCT/US2013/047913, mailed on Oct. 16, 2013, 5 pages.

Jo J., et al., "Synchronized One-to-many Media Streaming with Adaptive Playout Control," Proceedings of SPIE, 2002, vol. 4861, pp. 71-82.

International Bureau, "The International Search Report and Written Opinion", issued in connection with Application No. PCT/US2013/039494, mailed on Aug. 21, 2013,12 pages.

UPnP; "Universal Plug and Play Device Architecture"; Jun. 8, 2000; version 1.0; Microsoft Corporation; pp. 1-54.

International Bureau,"Written Opinion", issued in connection with PCT Application No. PCT/US2013/047913, mailed on Oct. 16, 2013, 5 pages.

\* cited by examiner

SYSTEMS AND METHODS FOR MULTI-NETWORK AUDIO CONTROL

FIELD OF THE DISCLOSURE

The disclosure is related to consumer electronics and, more particularly, to connect one or more devices to a playback data network.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved.

BRIEF DESCRIPTION OF THE DRAWINGS

Features, aspects, and advantages of the presently disclosed technology are better understood with regard to the following description, appended claims, and accompanying drawings where:

Figure 1:
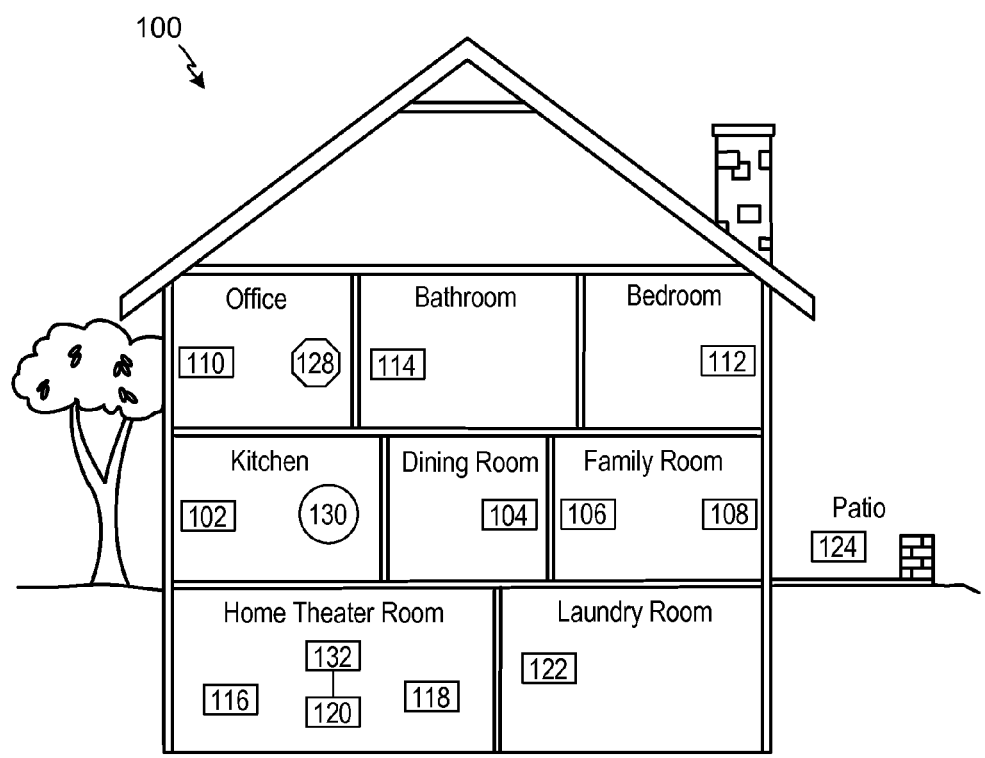
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Wired or wireless networks can be used to connect one or more multimedia playback devices for a home or other location playback network (e.g., a home music system). Certain examples provide automatic configuration of parameters of a playback device to be coupled to a network with reduced or minimum human intervention. For example, a wired and/or wireless ad-hoc network is established to facilitate communications among a group of devices. When a new device is added to the network, a rudimentary communication path is initially established between one of the devices ("first device") in the network and the new device ("second device") such that parameters (e.g., service set identifier (SSID), Basic Service Set Identification (BSSID), Wired Equivalent Privacy (WEP) security, channel frequency, and so on) can be exchanged for the new device to function properly in the network. To help ensure the parameters are exchanged in a secure fashion, an additional public security procedure can be used between the two devices, for example. To help ensure a good connection, a device can be configured to switch between available networks based on observed network characteristics.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

These embodiments and many additional embodiments are described more below. Further, the detailed description is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Certain examples provide a network, such as a wireless network (e.g., a wireless mesh network) used to connect multimedia playback devices, also referred to herein as zone players. A controller, such as a controller running on a smart phone (e.g., an Android™ smartphone, and Apple iPhone™, and Apple iPad™, and so on), a controller running on a personal computer, a dedicated controller (e.g., a Sonos CR 200™), and so on, can be used to control music playback and/or other activity on the one or more zone players connected to the network.

Certain embodiments provide a multi-room music system designed to play music throughout a house, vehicle, or other location via a wireless network. Unlike most other wireless networks, to simplify setup, encryption keys and SSIDs are automatically generated so a user does not have to manually generate them. Reliable playback of music or other multimedia content can be facilitated.

A traditional wireless access point system with a central hub relaying all the traffic typically does not provide a large enough range of coverage for an entire home or a desired level of performance for synchronized digital music playback (e.g., no dead spots or low signal strength). As long as each zone player is in range of another zone player, the wireless network can determine how to route music or other content from the Internet and a user's computer to the rooms where the user wants to enjoy it. Controllers are handed off transparently from one zone player to the next so that a user can control the system from the location.

In certain embodiments, a controller can connect to the network for playback via a variety of connections including via a local (e.g., home) wireless (e.g., WiFi) access point, such as a wireless router, and a local node formed by a zone player on the network. Thus, the controller can connect to the network and control multimedia playback or other zone player function via either a wireless access point or a zone player connected to the network. In certain embodiments, a controller can execute on a wireless device that can roam between a WiFi access point and a local zone player node. In certain embodiments, each network is associated with a different SSID, so the controller device is roaming between two different networks rather than roaming and connecting to the same network when in range, for example.

In certain embodiments one or more zone players connected to the wireless network utilize radio technology in conjunction with a multiple antenna configuration designed to accommodate a user's hands holding the device to select music or other content. For example, a three antenna configuration allows a zone player to operate at maximum efficiency to send and receive with an expected signal strength to provide a best possible wireless range and performance.

Certain embodiments provide an ability to connect a wireless device to a hidden network without the device or person knowing the network name or having to type in the network name (e.g., discovery and connection). For example, if a WiFi access point is not available, a controller (e.g., a smartphone controller) can connect to the hidden network without requiring the user to type in the network name and without the smartphone knowing the network exists.

In certain embodiments, setup technology searches for a wireless channel with the least interference and sets up a wireless network that is secure by default. A mesh networking stack is provided to automatically optimize the path on which data travels within a house or other location, so playback is heard without interruption. In certain embodiments, multicasting support is incorporated to facilitate delivery of the same data (e.g., the same song) to multiple rooms efficiently.

In certain embodiments, with a wireless (e.g., WiFi) connection, the wireless mesh network (e.g., SonosNet™ network) is placed second on a list of available networks, such that if a smartphone controller is out of range of a WiFi access point, then the smartphone will use the mesh network as the access point. Thus, since data can pass through a zone player as if the zone player was a WiFi access point, a local node zone player can be used as a connection point for multimedia playback, Web surfing, and so on. In certain embodiments, a wireless device (e.g., a smartphone) can select between a WiFi access point and a local zone player node as a network access point based on one or more criteria (e.g., which offers the best signal, least interference, and so on).

Embodiments of the systems, methods, apparatus, and/or articles of manufacture disclosed herein provide for network detection, control and management in connection with multimedia playback devices. As described in greater detail below, the systems, methods, apparatus, and/or articles of manufacture disclosed herein provide users of a wireless device, such as a phone or tablet computer, with an ability to connect to a hidden network. Systems, methods, apparatus, and/or articles of manufacture disclosed herein provide users of a wireless device, such as a phone or tablet computer, with an ability to monitor and switch among a plurality of available connections to maintain access to control and playback multimedia content.

Certain embodiments provide a method to connect a device to a playback network. The example method includes identifying a first network within range of a wireless device for connection. The example method includes initiating, by the wireless device, connection of the wireless device to the first network. The example method includes adding the first network to a list of a plurality of networks for connection by the wireless device. The example method includes monitoring, via the wireless device, one or more available networks from the list of networks that are within range of the wireless device. The example method includes evaluating the one or more available networks to identify a preferred network for connection based on at least one network characteristic. The example method includes facilitating a switch from connection of the wireless device to the first network if the preferred network is different from the first network.

Certain embodiments provide a computer readable storage medium including instructions for execution by a processor. The instructions, when executed, cause the processor to implement a method to connect a device to a playback network. The example method includes initiating, by the wireless device, connection of the wireless device to the first network. The example method includes adding the first network to a list of a plurality of networks for connection by the wireless device. The example method includes monitoring, via the wireless device, one or more available networks from the list of networks that are within range of the wireless device. The example method includes evaluating the one or more available networks to identify a preferred network for connection based on at least one network characteristic. The example method includes facilitating a switch from connection of the wireless device to the first network if the preferred network is different from the first network.

Certain embodiments provide a wireless device. The example wireless device includes a wireless communication interface to identify a first network within range of the wireless device available for connection and to facilitate connection of the wireless device to the first network. The example wireless device includes a processor to add the first network to a registry of networks for connection by the wireless device. The example wireless device includes a signal strength monitor to monitor one or more available networks from the list of networks that are within range of the wireless device. The example processor is to evaluate the one or more available networks to identify a preferred network for connection based on at least one network characteristic and facilitate a switch from connection of the wireless device to the first network if the preferred network is different from the first network.

II. Example Environment

Referring now to the drawings, in which like numerals can refer to like parts throughout the figures, FIG. 1 shows an example system configuration 100 in which one or more of the method and/or apparatus disclosed herein can be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone can cover more than one room or space. One or more of zone players 102-124 are shown in each respective zone. A zone player 102-124, also referred to as a playback device, multimedia unit, speaker, and so on, provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
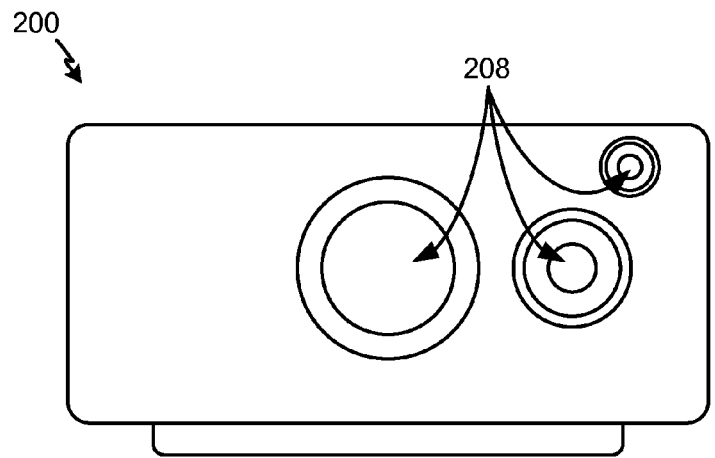
FIG. 2A shows an illustration of an example zone player having a built-in amplifier and speakers.
Figure 2B:
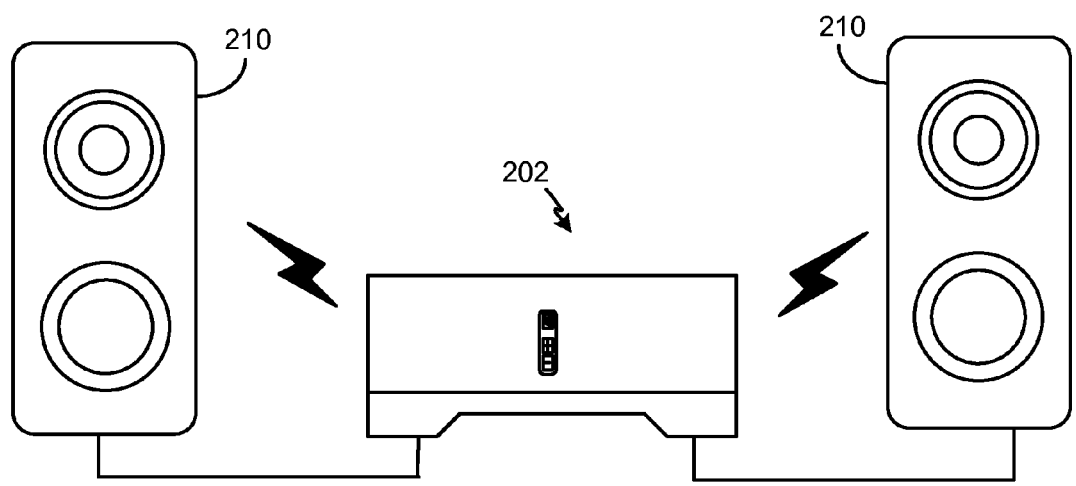
FIG. 2B shows an illustration of an example zone player having a built-in amplifier and connected to external speakers.
Figure 2C:
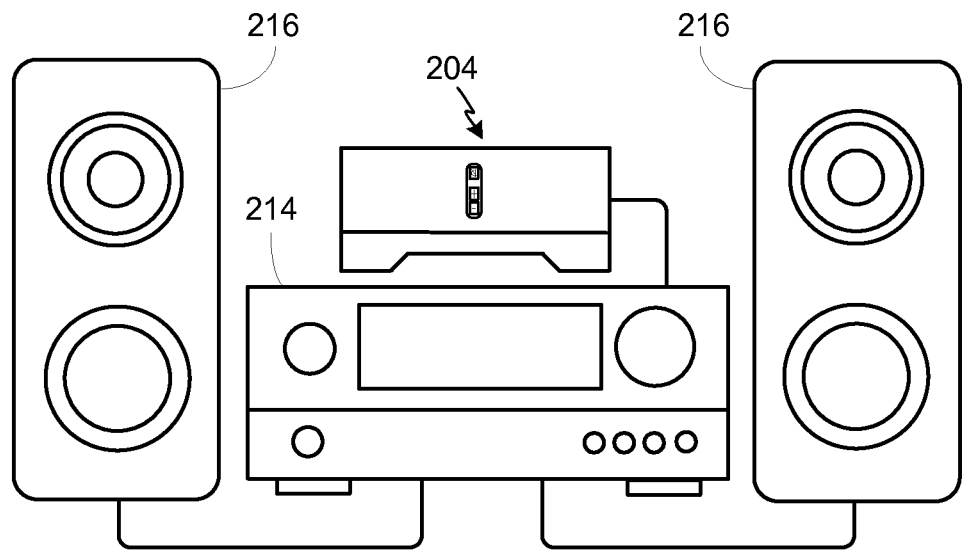
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, can correspond to any of the zone players 102-124 of FIG. 1. While certain embodiments provide multiple zone players, an audio output can be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer. In certain embodiments, the zone player 200 of FIG. 2A can be configured to play stereophonic audio or monaural audio. In some embodiments, the zone player 200 of FIG. 2A can be configured as a component in a combination of zone players to play stereophonic audio, monaural audio, and/or surround audio. As described in greater detail below, in some embodiments, the example zone player 200 of FIG. 2A can also transmit a second signal to, for example, other zone player(s) in the same or different zone(s), speaker(s), receiver(s), and so on. Transmission of the second signal can be part of, for example, a system in which multiple zone players, speakers, receivers, and so on, form a network to, for example, present media content in a synchronization or distributed manner.

The example zone player 202 of FIG. 2B includes a built-in amplifier (not shown in this illustration) to power a set of detached speakers 210. The speakers 210 of FIG. 2B can include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), and so on.

The example zone player 204 of FIG. 2C does not include an amplifier, but allows a receiver 214, or another audio and/or video type device with built-in amplification, to connect to a data network 128 of FIG. 1 and to play audio received over the data network 128 via the receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), and so on.

Example zone players include a "Sonos® S5," "Sonos Play:5," "Sonos Play:3," "ZonePlayer 120," and "ZonePlayer 90," which are offered by Sonos, Inc. of Santa Barbara, Calif. Any other past, present, and/or future zone players can additionally or alternatively be used to implement the zone players of example embodiments disclosed herein. A zone player can also be referred to herein as a playback device, and a zone player is not limited to the particular examples illustrated in FIGS. 2A, 2B, and 2C. For example, a zone player can include a wired or wireless headphone. In other examples, a zone player might include a subwoofer. In yet other examples, a zone player can include a sound bar. In an example, a zone player can include or interact with a docking station for an Apple iPod™ or similar device. In some embodiments, a zone player can relay one or more signals received from, for example, a first zone player to another playback device. In some embodiments, a zone player can receive a first signal and generate an output corresponding to the first signal and, simultaneously or separately, can receive a second signal and transmit or relay the second signal to another zone player(s), speaker(s), receiver(s), and so on. Thus, an example zone player described herein can act as a playback device and, at the same time, operate as a hub in a network of zone players. In such instances, media content corresponding to the first signal can be different from the media content corresponding to the second signal.

Figure 3:
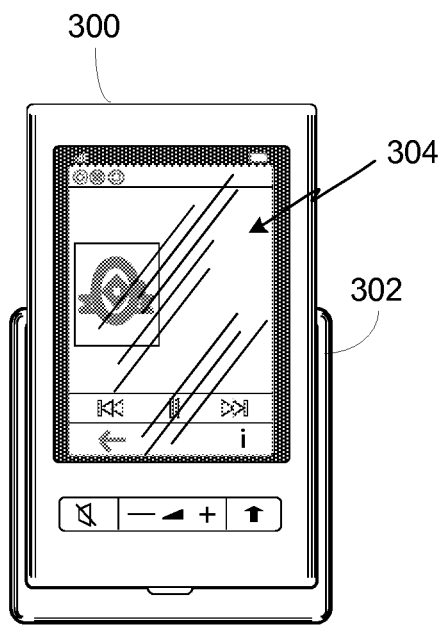
FIG. 3 shows an illustration of an example controller.

FIG. 3 shows an example illustration of a wireless controller 300 in a docking station 302. The controller 300 can correspond to the controlling device 130 of FIG. 1. The controller 300 is provided with a touch screen 304 that allows a user to interact with the controller 300, for example, to retrieve and navigate a playlist of audio items, control operations of one or more zone players, and provide overall control of the system configuration 100. In certain embodiments, any number of controllers can be used to control the system configuration 100. In certain embodiments, there can be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device can be used as a controller by connecting to the data network 128. An application running on a laptop or desktop PC or Mac can also be used as a controller. Example controllers include a "Sonos® Controller 200," "Sonos® Controller for iPhone," "Sonos® Controller for iPad," "Sonos® Controller for Android, "Sonos® Controller for Mac or PC," which are offered by Sonos, Inc. of Santa Barbara, Calif. The flexibility of such an application and its ability to be ported to a new type of portable device is advantageous.

Referring back to the system configuration 100 of FIG. 1, a particular zone can contain one or more zone players. For example, the family room of FIG. 1 contains two zone players 106 and 108, while the kitchen is shown with one zone player 102. Zones can be dynamically configured by positioning a zone player in a room or space and assigning via the controller 130 the zone player to a new or existing zone. As such, zones can be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network can be distributed in and around the system configuration 100.

Particularly, the data network 128 can be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In certain embodiments, the data network 128 can be created by connecting any of the zone players 102-124, or some other connecting device, to a broadband router. Other zone players 102-124 can then be added wired or wirelessly to the data network 128. For example, a zone player (e.g., any of zone players 102-124) can be added to the system configuration 100 by simply pressing a button on the zone player itself, which enables a connection to be made to the data network 128. The broadband router can be connected to an Internet Service Provider (ISP), for example. The broadband router can be used to form another data network within the system configuration 100, which can be used in other applications (e.g., web surfing). The data network 128 can also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones can be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone can be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players can play audio in synchrony with other zone players.

In certain embodiments, three or more zone players can be configured to play various channels of audio that is encoded with three channels or more sound. For example, the home theater room shows zone players 116, 118, and 120. If the sound is encoded as 2.1 channel audio, then the zone player 116 can be configured to play left channel audio, the zone player 118 can be configured to play right channel audio, and the zone player 120 can be configured to play bass frequencies. Other configurations are possible and depend on the number of zone players and the type of audio. Further, a particular zone can be configured to play a 5.1 channel audio in one instance, such as when playing audio from a movie, and then dynamically switch to play stereo, such as when playing audio from a two channel source.

In certain embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) can be accessed via the data network 128 and played. Internet radio stations, shows, and podcasts can be accessed via the data network 128. Music services that let a user stream and download music and audio content can be accessed via the data network 128. Further, music can be obtained from traditional sources, such as a turntable or CD player, via a line-in connection to a zone player, for example. Audio content can also be accessed through AirPlay™ wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

The example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Playback Device

Figure 4:
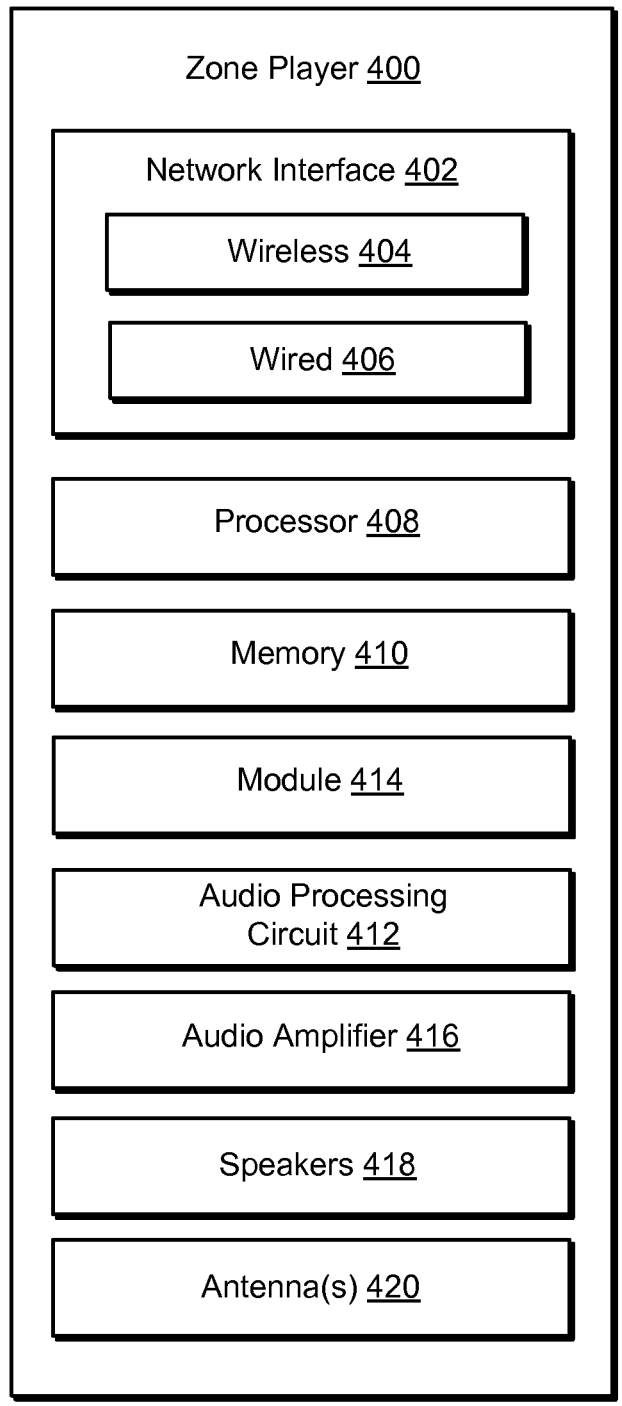
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, and a speaker unit 418 coupled to the audio amplifier 416. FIG. 2A shows an example illustration of such a zone player. Other types of zone players can not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 can manage the assembling of an audio source or file into smaller packets that are to be transmitted over the data network or reassembles received packets into the original source or file. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software modules 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software modules 414 and the processor 408.

The audio processing component 412 can include one or more digital-to-analog converters (DAC), an audio preprocessing component, an audio enhancement component or a digital signal processor, and so on. In certain embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example.

A zone player 400 can also be referred to herein as a playback device. An example playback device includes a Sonos® Play:5, which is manufactured by Sonos, Inc. of Santa Barbara, Calif. The Play:5 is an example zone player with a built-in amplifier and speakers. In particular, the Play:5 is a five-driver speaker system that includes two tweeters, two mid-range drivers, and one subwoofer. When playing audio content via the Play:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from a Sonos® Play:5. While the Play:5 is an example of a zone player with speakers, it is understood that a zone player with speakers is not limited to one with a certain number of speakers (e.g., five speakers as in the Play:5), but rather can contain one or more speakers. Further, a zone player can be part of another device, which might even serve a purpose different than audio (e.g., a lamp).

IV. Example Controller

Figure 5:
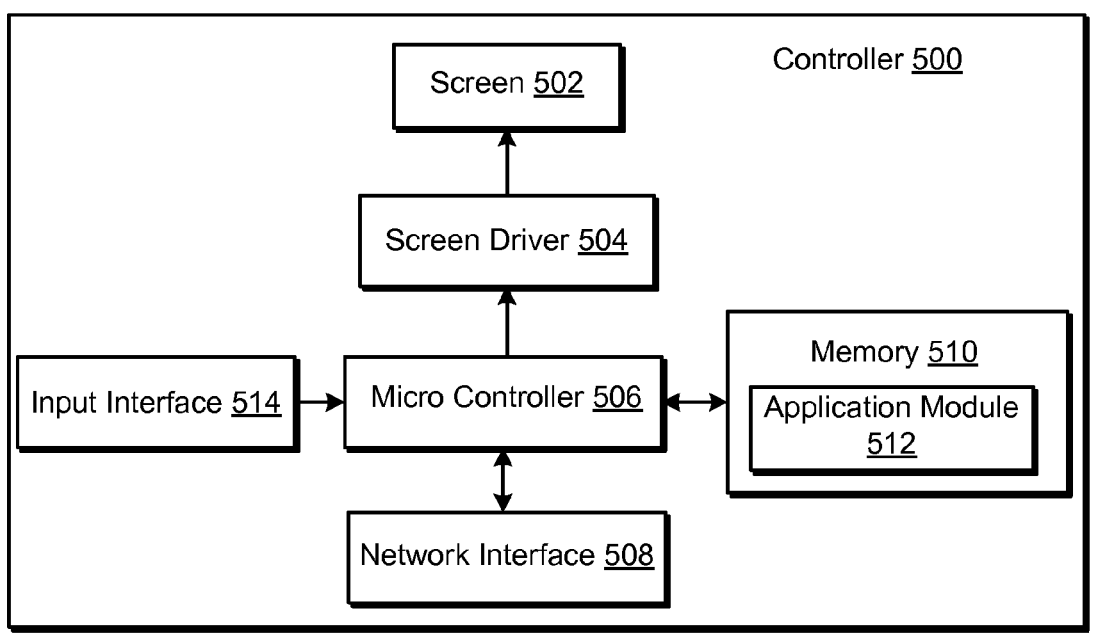
FIG. 5 shows an internal functional block diagram of an example controller.

Referring now to FIG. 5, there is shown an example controller 500, which can correspond to the controlling device 130 in FIG. 1. The controller 500 can be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source can be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system. Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network enabled device to perform the functions described herein.

In certain embodiments, a user can create a zone group including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
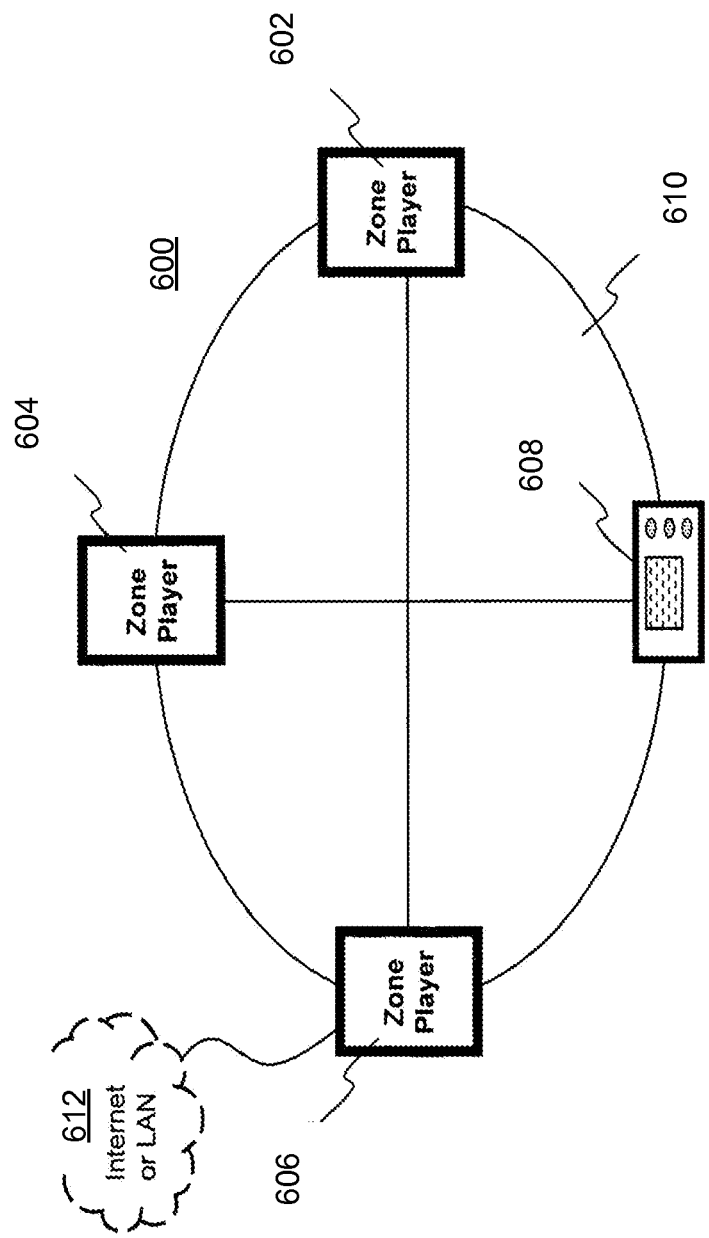
FIG. 6 shows an example ad-hoc playback network.

Certain particular examples will now be provided in connection with FIGS. 6-8B to describe, for purposes of illustration only, certain base systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610.

Using the Ad-Hoc network 610, the devices 602, 604, 606, and 608 can share or exchange one or more audio sources and be grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 10 (or household identifier).

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example.

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously. In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet while the connectivity to other devices 602, 604 and 608 is based on Wireless. It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

In certain embodiments, a rudimentary communication path is established to connect a zone player to a household or other location network. In reference to FIG. 6, a zone player is not yet a member of a HOUSEHOLD. It is assumed that the zone player is to be added to become a member of the HOUSEHOLD by a cable or wireless. When the zone player is initially turned on, it executes an embedded module that is configured to establish a rudimentary communication path with another device (e.g., network-enabled). The rudimentary communication path facilitates the automatic configuration of the zone player via another device. This communication path may operate over wireless and/or Ethernet protocols, as the zone player may be connected to one or both. In operation, the communication path does not negatively affect other devices in the vicinity and can reach all other members of the HOUSEHOLD (both CPs and ZPs), if any are available. In certain embodiments, the communication path does not have to be direct between two devices and may be bridged by one or more other devices. Because the communication path is only used for initial device configuration, it does not require significant performance or sophisticated functionality. There are at least two elements to establish the communication path: channel selection and packet exchange.

In certain embodiments, selection of an appropriate transmission channel (e.g., a radio frequency (RF) channel) is primarily an exercise in two constraints: finding a channel that is quiet from a protocol (e.g., 802.11) viewpoint (e.g., minimal conflicting wireless traffic) and finding a channel that is quiet from an RF viewpoint (e.g., minimal noise from other signals). Both of these tests may be applied because a home environment can have other RF (e.g., 2.4 GHz) traffic or potentially other wireless access points.

Channel selection can be accomplished, for example, with a scanning technique, namely the device listens on each channel for a period of time, looking for the presence of wireless beacons and other RF signals. In an embodiment, devices that are configured have a preferred channel for the HOUSEHOLD, and devices that are not configured have a pre-defined (default) channel or channels on which they rendezvous. For example, 802.11b/g channel 1 can be pre-configured as the default channel. Alternatively, multiple channels, with a well-known frequency hopping sequence, can be used by the devices (e.g., using an aperiodic frequency change interval).

In certain embodiments, many hardware configurations only support reception/transmission on a single channel at a given time. Also there are configured and unconfigured devices that may use different channels for the bootstrap configuration and standard network operations (post-configuration communications). In certain embodiments, devices are placed in a "configuration" mode, whereby they use the appropriate channels for communication.

To enable communication between devices that are not part of the same HOUSEHOLD, a packet exchange network infrastructure is developed. Probing messages are sent in such a way that they traverse both the Ethernet and wireless networks, reaching any connected devices. Devices that are already in a HOUSEHOLD constitute a network infrastructure that can be used to exchange unicast and multicast/broadcast network frames between the devices. A device that is not yet in the HOUSEHOLD has a much more limited networking capability and can only receive data from devices to which it is directly wired, and unencrypted messages broadcast to all wireless networks operating in a particular channel of the RF spectrum, for example.

In certain embodiments, an IP address of a new device is not known to any members of the HOUSEHOLD. If the device is purely wireless, it may not have an IP address at all, or it may have an automatically assigned IP address that is inaccessible to other devices with IP addresses respectively assigned by a DHCP server. To allow devices that are not members of the HOUSEHOLD to join the HOUSEHOLD, a transport may be constructed that can get data one "hop" beyond the HOUSEHOLD network infrastructure.

In certain embodiments, packets of data are broadcasted among the members of the HOUSEHOLD. The packets of data comprise a mixture of "probe" datagrams and IP broadcast. For example, the 802.11 "probe" datagrams are used to cross wireless network boundaries. In other words, the "probe" datagrams can be received by all listeners (e.g., other devices) on the channel, even those that are not configured with an SSID, because they are sent to the broadcasting satellite service (BSS) (e.g., FF:FF:FF:FF:FF:FF) to which all devices may be configured to listen. An IP broadcast is used on the wired network segments and the HOUSEHOLD network infrastructure to enable a PC-based controller to participate while running with standard user privileges (which allow access only to IP-based network services), for example. Used together, the combination of "probe" datagrams and IP broadcast provides for a broadcast datagram transport that allows even devices that have not had any networking parameters configured to communicate.

In certain embodiments, probe datagrams include a number of elements to facilitate the configuration of other devices to join the HOUSEHOLD. In an embodiment, each of the elements carries up to 255 bytes of data. An element contains data payload for each message used by the bootstrap procedure to invite others to join the HOUSEHOLD. This element is repeated as many times as necessary to carry the complete message. In an embodiment, the IP broadcast datagrams contain the same data payload as the normal IP data payload.

Messages relating to the bootstrap procedure can be forwarded beyond the boundaries of an existing HOUSEHOLD network infrastructure (e.g., including properly configured wireless devices and the wired network). Similarly, messages originating outside of the HOUSEHOLD network infrastructure can be forwarded into the infrastructure. Forwarding can be accomplished in a mixed wireless/wired network environment without introducing a broadcast storm. A broadcast storm is a state in which a message that has been broadcast across a network results in more responses than necessary, and each response results in even more responses in a snowball effect, subsequently resulting in a network meltdown or lockup. In certain embodiments, the network is configured to help prevent such a broadcast storm or illegal broadcast messages. To accomplish this, two flags are included in the message body, for example, "SENT_AS_PROBE" and "SENT_AS_IP_BROADCAST." When a device receives a "probe" message, assumed using a "Sonos Netstart" SSID (or broadcast BSS), the device forwards the message as an IP broadcast message (e.g., after setting a "SENT_AS_IP_BROADCAST: flag) if the SENT_AS_IP_BROADCAST flag is not already set. Similarly, when the device receives an IP broadcast with a user datagram protocol (UDP) payload address to an appropriate port (e.g., port number 6969), the device forwards the message as a "probe" datagram (e.g., after setting a "SENT_AS_PROBE" flag) if the SENT_AS_PROBE flag is not already set. This allows messages related to the packet exchange both to enter and to exit the HOUSEHOLD network infrastructure without causing a broadcast storm.

Using this method of broadcast communication, packets can be sent between a member of the HOUSEHOLD and a device to join the HOUSEHOLD on both Ethernet and wireless networks. The device to join the HOUSEHOLD may be a new device or a device previously configured with a different network (e.g., a device with a stale configuration in a different household), for example. In addition, if used sparingly, these broadcast messages do not interfere with the normal operation of the network or attached devices. As a result, a communication path on an agreed channel has been established between two devices.

In certain embodiments, to reduce or minimize impact on existing networks and to improve configuration security, a user can manually activate the auto-configuration process. Manual user activation may be accomplished by a specific action on each device that is being added to the network. For example, if the user is installing a new HOUSEHOLD, containing one CP and two ZPs, the activation process can be manually activated on each by, for example, powering off and on, pushing a reset button or pushing two or more specific buttons simultaneously on the ZP or CP. In an embodiment, the CP or ZP is powered up by the user, which activates the pre-installed module to start the bootstrap procedure.

For a ZP, if the device is unconfigured (e.g., factory default settings), the device goes into a "sleep" mode where the device is awaiting an activation command. If the ZP has been previously configured, the ZP attempts to contact other members of its HOUSEHOLD network. If the ZP is orphaned, namely the ZP was previously configured (e.g., perhaps, with another Ad-hoc network) and now is to be added to the HOUSEHOLD (e.g., the ZP is obtained from a previous owner), the ZP can attempt to contact its original network. It can be perceived that this operation will be unsuccessful but otherwise harmless, for example. Even in this configured state, the device can participate in the rudimentary broadcast communication processes described above.

For a CP, if the device is unconfigured (e.g., factory default settings), the CP presents the user with a description of how to start the configuration process. If the CP device is configured, the CP attempts to contact other members of its HOUSEHOLD network. The CP may also be an orphaned device, in which case it performs similarly to that of the ZP, for example.

In both cases, correctly configured devices establish network communications and make themselves available for normal operation. All devices, including those previously configured, enter an "activation state" when the user indicates that this is desired. At this point, the configuration process can begin.

Figure 7:
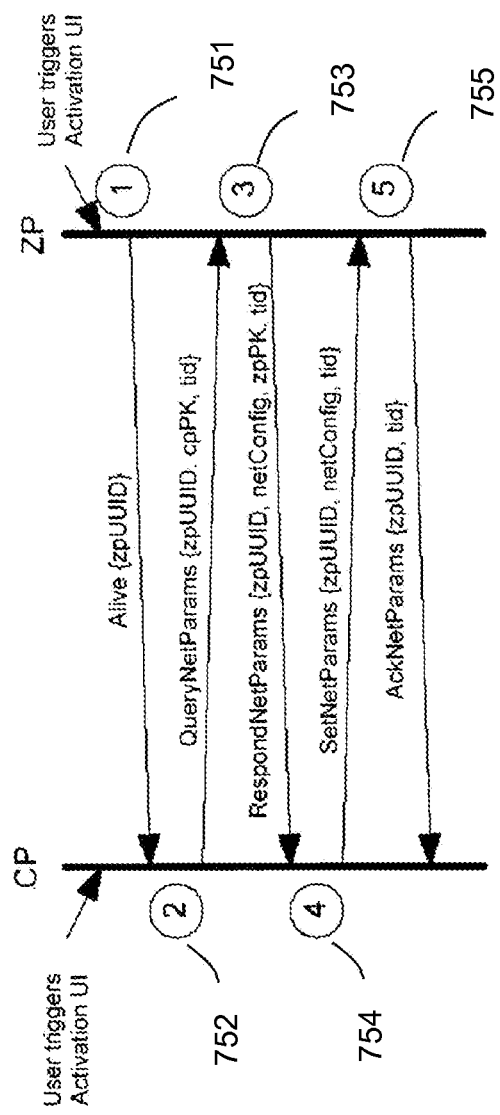
FIG. 7 shows an example data exchange between two devices for device configuration with respect to a network.

In certain embodiments, device configuration is facilitated by exchanging data between two devices that are not necessarily directly connected. The exchange procedure is carried over a rudimentary communication path such as described previously. The sequence of exchanging the data is initiated by the user or some other process, for example, activating a reset button, to trigger the "activation" or configuration mode on the involved devices. Each device executes this sequence, and then exits the activation mode. FIG. 7 shows an embodiment that involves a process of five exchanges of data.

Each of the data exchanges is referred to as a type of message: Alive, QueryNetParams, RespondNetParams, SetNetParams, and AckNetParams, each of which is explained as follows.

An Alive message is a message indicating that a named ZP is available for configuration. The message includes at least a zpUUID (a zone player "universally" unique identifier) which is a globally unique identifier that identifies the ZP sending the message.

A QueryNetParams message is a request from the CP to the ZP to respond with the ZP's current network configuration information. The request includes at least a zpUUID, cpPK (e.g., an RSA public key of the CP) and a tid (a unique transaction identifier).

A RespondNetParams message is a response to the QueryNetParams message. The message includes the ZP's network configuration information (e.g., HHID, WEP key and RSA public key). For security reasons, the WEP key is encrypted using the CP's public key that is only readable by the CP. The response includes at least a zpUUID, netConfig (the ZP's current network configuration parameters), zpPK (e.g., a public key for the ZP), and a tid. In certain embodiments, a new ZP, set to factory defaults, can have well-known parameter values, allowing the CP to determine that the ZP is unconfigured.

A SetNetParams message is a command message from the CP to the ZP indicating that the ZP should reconfigure its network parameters. The WEP key is encrypted using the ZP's public key, and, therefore, only readable by the ZP. The command includes at least a zpUUID, netConfig and tid. In certain embodiments, netConfig includes new configuration parameters for the ZP, as determined by the CP. The ZP saves this value in its network configuration. In some cases, these parameters may match the ZP's existing configuration.

An AckNetParams message is a response to the SetNetParams messaging. The response indicates that the SetNetParams message was received and that the network configuration contained therein has been successfully applied. The response includes at least a zpUUID and a tid.

In operation, after a user activates the configuration process (on both ZP and CP) at 751 in FIG. 7, the CP enters a state where it is willing to accept an Alive message. The CP remains in this state for a certain (e.g., specified or finite) period of time. The ZP enters an activation state where it attempts rendezvous with a CP. The ZP remains in this state for a certain limited period of time. The ZP periodically transmits an Alive message until it either receives a QueryNetParams message or exits the activation state.

At 752, the CP receives an Alive message. If the CP is in the configuration mode, it generates a new tid, and sends a QueryNetParams message to the ZP. The CP may or may not have been configured at this point. In either case, the CP sends the QueryNetParams message. At 753, if the ZP is already in the activation state, the ZP responds to a QueryNetParams with its current network configuration. If the ZP is unconfigured (e.g., factory default settings), the ZP returns an empty HHID and WEP key. If the ZP is previously configured, the ZP returns its current configuration. The ZP also returns its public key such that the WEP key can be encrypted using the CP's public key, for example.

At 754, upon receiving the ZP's current configuration information, the CP decides on a course of action. In certain embodiments, most, but not all, of these options result in a SetNetParams message being sent to the ZP. An example matrix of possible situations is as follows:

|  | CP already configured | CP not configured |
| --- | --- | --- |
| ZP already configured | The CP sends a SetNetParams message to the ZP containing the CP's current net configuration. ZP not The Cp sends a configured SetNetParams message to the ZP containing the CP's current net configuration. | The CP sets its own configuration to match the ZP configuration, and the configuration process is terminated. |
| ZP not configured | The CP sends a SetNetParams message to the ZP containing the CP's current net configuration. | The CP generates new configuration parameters. The parameters are sent to the ZP in a SetNetParams message. The CP sets its own configuration to these values as well. |

At 755, when the ZP receives a SetNetParams message, the ZP reconfigures its own HHID and WEP key to match those contained in the network packet. Accordingly, the CP determines that it generates new configuration parameters in accordance with the following. For example, an HHID is provided by the user via the CP user interface or automatically generated by the CP. An SSID is automatically generated by the CP (e.g., set to the same value as the HHID). A WEP Key is automatically generated (e.g., using a pseudo-random number generator, seeded with entropy collected by the CP). The CP probes the network looking for an acceptable channel (e.g., based on a variety of criteria, which may include traffic and interference from other sources).

Following the activation process, devices that have been reconfigured attempt to establish normal network communications using their new network configuration parameters. In certain embodiments, if the CP or ZP is not already in the activation state, receipt of messages is ignored.

In certain embodiments, if there are multiple ZPs activated simultaneously (or substantially simultaneously), the devices can execute this same sequence, independently of each other (e.g., the CP is capable of multiple independent sessions). If multiple CPs are activated, each can respond to a ZP's Alive message and execute the sequence. The first CP to deliver the SetNetParams to the ZP will configure it. In this case, the second CP may never get an AckNetParams message because the ZP has exited the activate state. In certain embodiments, a transaction timeout may occur in the second CP, at which point the CP may inform the user of the error or retry the entire sequence. If the CP retries the entire sequence, it will not reprogram the ZP, for example.

Certain embodiments provide security in network communications. For example, to help ensure that wireless communication among the members in a HOUSEHOLD is secure, multiple issues in auto-configuration are resolved. For example, while packet exchange broadcasts may be unencrypted, public key cryptography is used to help ensure that WEP keys are securely distributed. Because the network configuration process is automated and the data is transmitted over the network, in certain embodiments the auto-configuration process is started manually by a user. When one of the connected devices is removed from the HOUSEHOLD, the device is reset to a factory default configuration (e.g., erases WEP keys and other private information) so that the device can no longer access to the network. In certain embodiments, a user can validate that he or she has correctly configured one or more devices using a validation/status user interface on the Control Point.

In certain embodiments, the configuration process uses public key cryptography to exchange WEP keys and other information that should not be visible to any party sniffing the network. In an embodiment, an exchange is facilitated by designating a certificate authority (CA) to issue signed public key certificates. Each CP and ZP is factory configured with a unique certificate, public and private key, in a format that supports the RSA algorithm. The certificate is signed and issued by the designated CA, and includes a hash of the MAC address of a device, for example. The CP and ZP exchange public keys, and WEP keys are encrypted using the public key. In certain circumstances, the devices compare the MAC in received packets with that in the certificate to add an additional layer of security.

Figure 8A:
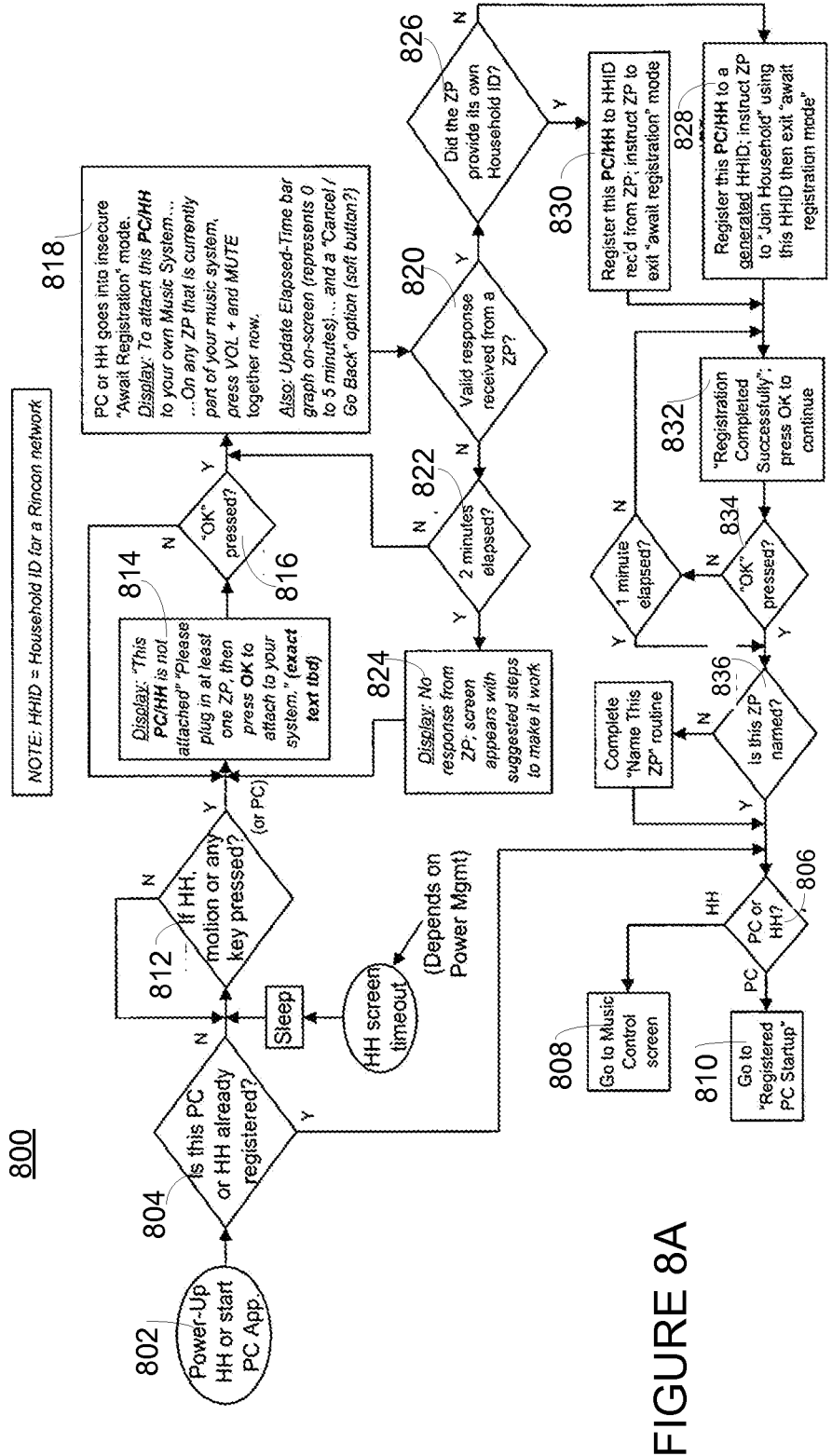
FIGS. 8A-8B show flowcharts for example methods or processes for playback device and network configuration.

FIG. 8A shows a flowchart for an example method or process 800 for playback device and network configuration. The process 800 can be implemented in hardware, software or a combination of both as a method, a system or a process. In certain embodiments, the process 800 is implemented for a handheld controller or a computing device. To facilitate the understanding of the process 800, the description herein is based on a handheld controller, such as the controller 608 of FIG. 6, which shall not be considered as limiting with respect to the presently described technology.

In certain embodiments, a handheld controller is equipped with a mechanism to allow a user to reset itself. In certain embodiments, the reset is done when the controller is powered up. At block 802, it is assumed that the controller is powered up. At block 804, it is determined whether the controller is configured. A configured controller is ready for communication with other devices (e.g., zone players) that may or may not be on a network, such as a wireless network. In the context of FIG. 6, it means that the handheld device 608 is ready to communicate with each or all of the devices 602, 604, and 606 (assuming that the devices 602, 604, and 606 have not been configured yet), for example.

If the controller is configured, at block 806, where it determines whether the device is a handheld (HH) controller device or a computer. For example, the device may be a dedicated handheld controller, a personal computer or other type of device. In the illustrated embodiment, the type of device is determined because a handheld controller and a computer may provide a different display or graphic environment. If the device is a handheld controller, at block 808, the controller displays a screen for a user to proceed with the control of one or more zone players connected to the playback network or replay of certain multimedia content via one or more zone players. If the device is a computer, the computer is loaded with a module that is executed to display an environment (e.g., a graphic user interface or GUI) that allows a user to perform many tasks that may be done on the handheld controller in addition to other tasks that may be assisted by a pointing device (e.g., a mouse) or a keyboard.

At block 804, it is now assumed that the device is not configured, and, at block 812, it is determined if a user has activated the automatic configuration process. In an embodiment, the controller goes into a "sleep" mode after a predefined time should there be no activation of the configuration process. When the user activates the configuration process (e.g., via motion or button press), it is determined, at block 814, whether the controller itself is coupled to an access point of a network or at least a member of the HOUSEHOLD (e.g., one zone player) is coupled to the access point or an Ad-Hoc network. Typically, a GUI is provided for a handheld or a computer. Accordingly, a display with a relevant message is displayed. After it is determined that either the controller itself or a zone player is coupled to a network, a user can press "OK" in the displayed GUI, for example.

At block 818, the user can manually activate the automatic configuration process manually. In an embodiment, two buttons (e.g., labeled respectively as "VOL" and "Mute") can be pressed concurrently by the user to initiate the automatic configuration process. At block 820, the process determines whether a valid response is received from a zone player. If not, after a certain time 822, the process 800 goes back to block 818 to reactivate the process or to block 814 via block 824 to prompt or remind the user regarding connection to the network.

In certain embodiments, a handheld controller is configured to facilitate a new zone player to execute a household join process to join the HOUSEHOLD upon an appropriate channel. The channel can be agreed upon between the controller and the zone player. For example, when a reset or multiple (e.g., two) buttons are pushed on the zone player to "activate" the household join process, the zone player scans through the available wireless channels, sending the "Alive" datagram for each channel in turn. The channels can be cycled through several times, for example. When the zone player receives a QueryNetParams request addressed to the zone player, it stops the channel cycling. The zone player remains locked on the channel on which it received the request until a successful sequence ending in the configuration of the zone player is completed (at which point it uses the specified channel), or a timeout expires (at which point it returns to its original channel or resumes cycling through channels and sending alive messages if the overall timeout for the activation process has not expired).

In certain embodiments, although the zone player performs the channel cycling, the controller may also be configured to perform the channel cycling. However, when the controller is, for example, a personal computer, the zone player is typically configured to cycle through the available channels.

When a valid response is received from the zone player, the process 800 determines whether the zone player provides its own network name (e.g., HHID) at block 826. If the zone player does not have an HHID, which indicates that the zone player is to be added into a wireless network named after an HHID provided by the device, then at block 828, the zone player is instructed to join the wireless network. If the zone player does have an HHID, which indicates that the device itself is to be added into the wireless network named after the HHID provided by the zone player, the process exits at block 830.

After execution of the automatic configuration process is completed, a message or an indication of completion is displayed. After the user acknowledges, at block 834, the user is asked to name the zone player, for example, "Dining" which indicated that the zone player is in the dining room. Subsequently, the process continues to block 406, described above.

Figure 8B:
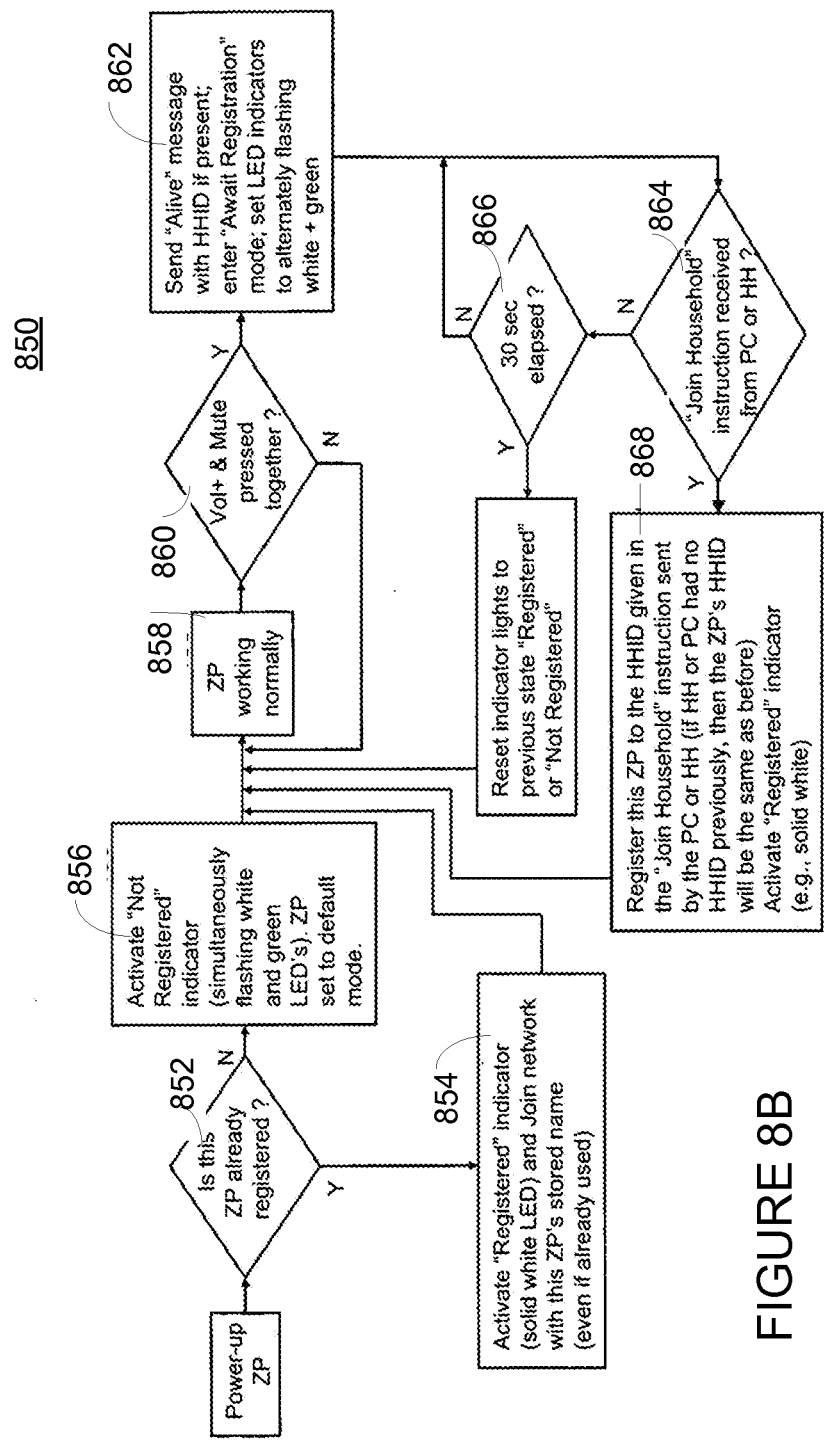

FIG. 8B shows a flowchart for an example method or process 850 that can be also implemented in hardware, software or a combination of both as a method, a system or a process. In certain embodiments, the process 850 is implemented for a zone player. To facilitate the understanding of the process 850, the illustrative description herein is based on a zone player, such as the player 602 of FIG. 6, which shall not be considered to limit the presently described technology.

When a zone player is powered up, the process 850, at block 852, determines whether the zone player is already registered or configured. For example, if the zone player is a used zone player, the zone player may already be configured. If the zone player is configured, at block 854, an indication of "registered" is shown. If the zone player is not configured, block 856 indicates an unconfigured ZP. At block 858, "normal" operation of the zone player is confirmed (e.g., through an internal checkup).

At block 860, a user activates the automatic configuration process by, for example, pressing two buttons, labeled respectively as "VOL" and "Mute", on the zone player at the same time. The automatic configuration process starts by sending out an Alive message, at block 862, as described above. At block 864, the zone player awaits a response. If no response is received within or beyond a predefined time, the process 850 goes to block 866 or block 858 to continue waiting for a response or restart the process. When a response is received, the automatic configuration process continues at block 868, at which the zone player is now part of the wireless network named after an HHID received either from a configured device or provided by itself.

VI. Example Hidden Network Access and Network Switching

As an alternative or addition to the connection systems and methods described above, certain additional embodiments for network connection and switching are also described.

Certain embodiments provide a controller application running on a wireless device to enable a user to connect to one of multiple available networks. For example, using a controller application on Android™ smart phone, the user can connect to a playback device network via either of their household (or other location) wireless connection and the playback device mesh network in order to control the playback devices on the network. In certain embodiments, the wireless device controller application can transition or roam between the two connections and maintain control of content playback, such as audio music playback, on any of the connected playback device(s).

Figure 9:
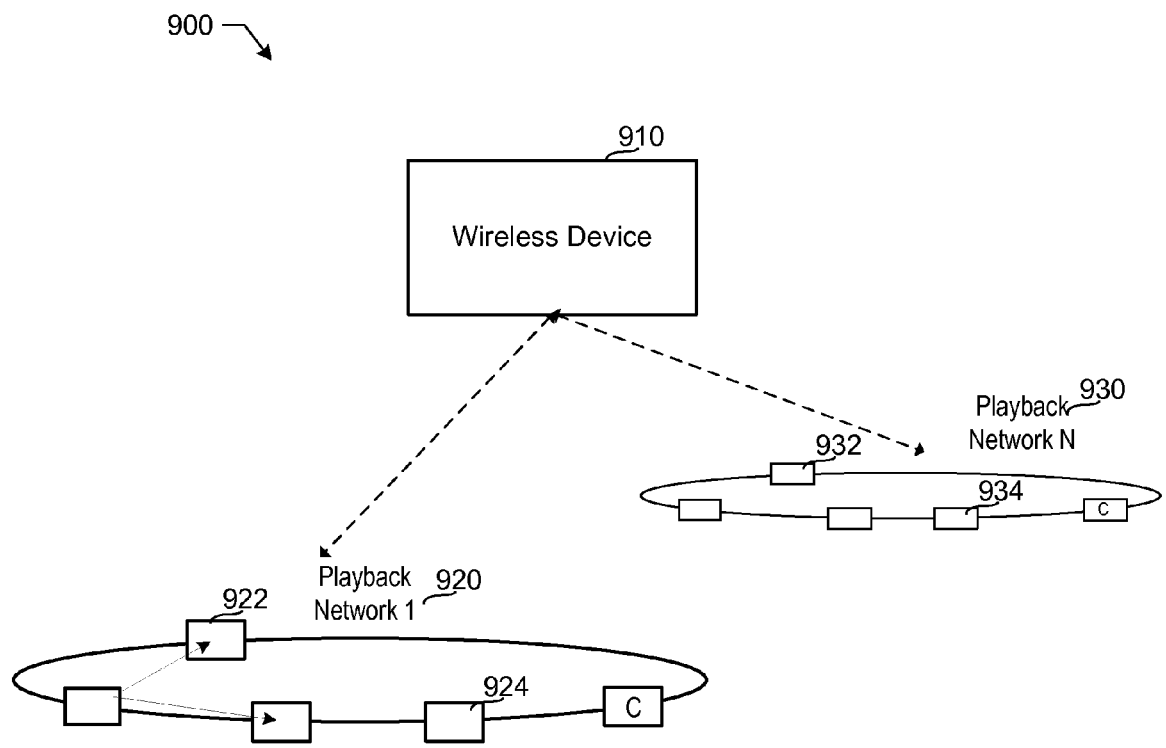
FIG. 9 shows an example multimedia playback system in which a wireless device is attempting to connect to an available network to playback multimedia content.

For example, FIG. 9 shows a multimedia playback system 900 in which a wireless device 910 is attempting to connect to an available network to playback multimedia content. The wireless device 910 can connect to one or more available networks 920, 930 via one or more devices on the network 920, 930. Each network 920, 930 can include one or more devices or points of access for that network, for example. The wireless device 910 (e.g., a controller, smartphone, tablet computer, etc.) can connect to a wireless access point 922, 932 and/or other device 924, 934 (e.g., a zone player, speaker, other playback device, etc.) in the network. 920, 930.

For example, if a user has no wireless access point in a home network or the wireless controller device is not within range of a wireless access point when the controller is first set up on a wireless device, a wireless device on which the controller is being installed securely establishes a connection to the playback device network directly if the wireless device is within range one of the playback device devices or other components that form a part of the playback network. For example, using a join-household button on a zone player (an example playback device), the user can configure his or her smartphone to operate as a controller for the playback network.

Certain embodiments provide a service to run continuously in the background on the wireless controller to actively manage the decision of whether to connect to the playback network or another available wireless network in order to improve or maintain user experience as the user moves from location to location.

Figure 10:
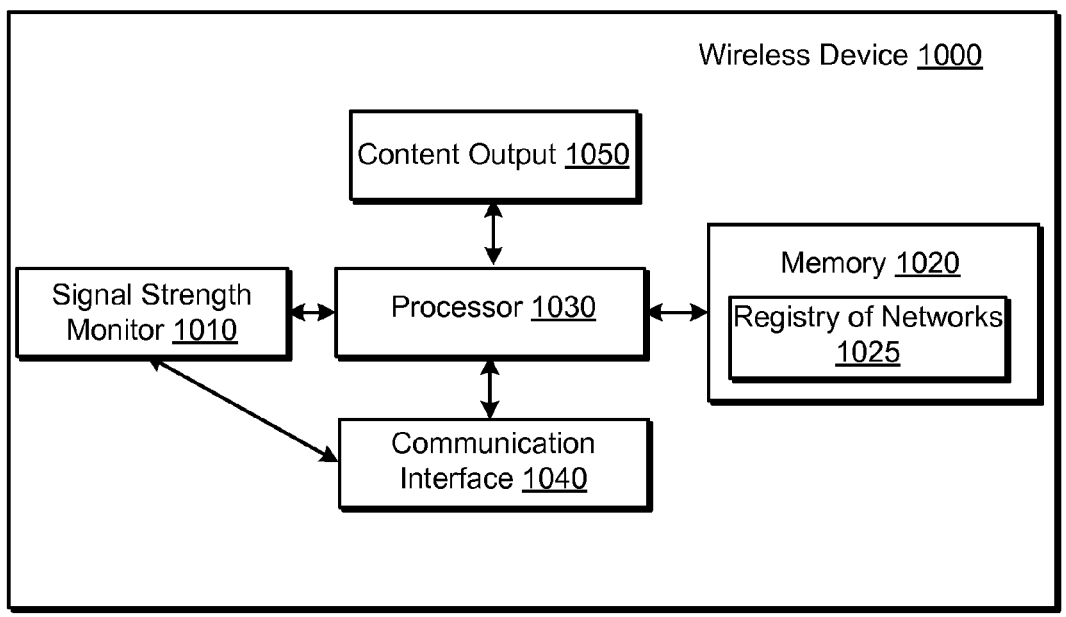
FIG. 10 depicts an example wireless device connecting to a network and monitoring available network connections.

For example, FIG. 10 depicts an example wireless device 1000 (e.g., the same as or similar to the wireless device 910) including a signal strength monitor 1010, a memory 1020 including a registry of networks 1025, a processor 1030, a communication interface 1040, and a multimedia content output 1050. The device 1000 can connect to an available network using the communication interface 1040 and facilitate playback and/or other communication of content via the output 1050 in conjunction with the processor 1030. Using the signal strength monitor 1010, the device 1000 can continuously (or periodically, etc.) monitor available networks identified in the registry of networks 1020 and use the processor 1030 to determine whether another available network is preferable for connection than the currently connected network (e.g., stronger signal, better security, and so on).

Figure 11:
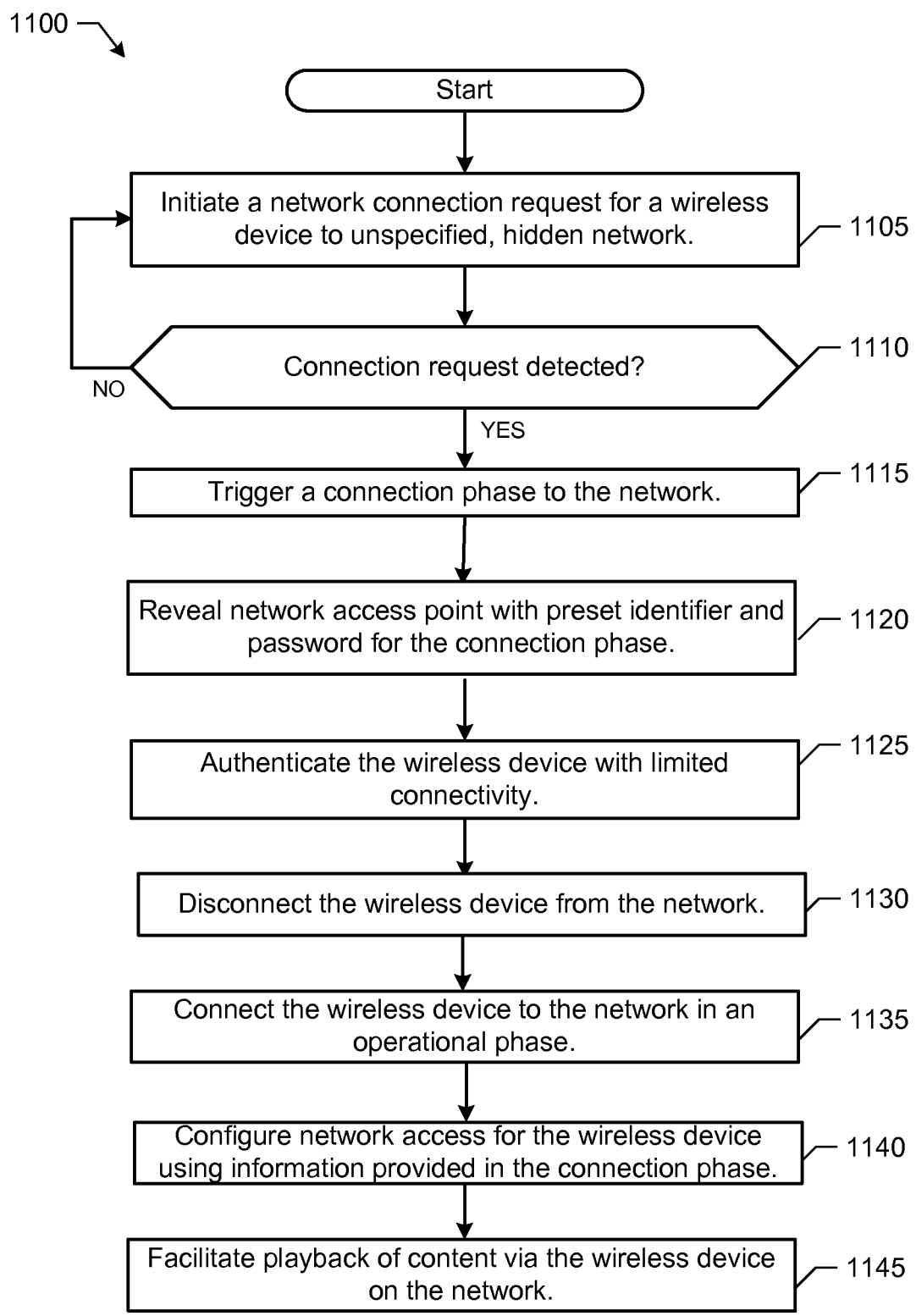
FIG. 11 illustrates a flow diagram for an example method to connect a wireless device to a hidden network without the device or user network the network name or having to type in the network name.

FIG. 11 illustrates a flow diagram for an example method 1100 to connect a wireless device to a hidden network without the device or user network the network name or having to type in the network name.

At block 1105, a network connection request is initiated for a wireless device to connect to an unspecified audio network available but hidden at a location. For example, a connection request can be initiated via a controller device (e.g., a smartphone, dedicated controller, tablet computer, laptop computer, etc.) within range of the audio network at the location (e.g., a household, building, or other location). As another example, a connection request can be initiated via a button press on a multimedia playback device connected to the audio network.

At block 1110, a network connection request to the audio network is detected. The request can be detect via a multimedia playback device (e.g., a zone player, speaker, output, etc.) already connected to the hidden audio network, for example. The audio network is unspecified in the request and is available but hidden at the location.

At block 1115, a connection phase is triggered to connect the wireless device to the hidden audio network. The connection phase can be triggered via the multimedia playback device, for example. In certain examples, the connection phase is triggered without sending a response to the request from the multimedia playback device. In certain embodiments, no response is provided to broadcast probes unless an action has recently been taken (e.g., one or more buttons recently pressed) on the multimedia playback device and/or other network component.

At block 1120, a network access point is revealed with a preset identifier to the wireless device to which the wireless device can connect using a predefined password valid during the connection phase. In certain embodiments, the network access point is subsequently hidden once the identifier and password are provided to the connecting device.

At block 1125, the wireless device is authenticated with the audio network using the predefined password via the network access point. The wireless device is associated with the audio network with limited connectivity to the audio network during the connection phase.

At block 1130, the wireless device is disconnected from the audio network. At block 1135, a connection of the wireless device to the audio network is accepted in an operational phase. The connection is enabled using information provided to the wireless device during the connection phase and without the limited connectivity provided in the connection phase, for example.

At block 1140, network access is configured for the wireless device using information provided to the wireless device during the connection phase. At block 1145, playback of content is facilitated via the multimedia playback device on the audio network. For example, playback can be facilitated using the wireless device.

Thus, in certain embodiments, a multimedia playback device is connected to a local multimedia playback network that is configured to hide (e.g., not provide an indicator of its existence) absent a command from the multimedia playback device. The multimedia playback device initiates a connection phase for a device to connect to the hidden network based on a user action at the multimedia playback device (e.g., a button press). The multimedia playback device then reveals a network access point with a preset identifier to the wireless device to which the wireless device can connect using a predefined password valid only during the connection phase. The wireless device is authenticated with the audio network using the predefined password via the network access point and associated with the audio network with limited connectivity to the audio network during the connection phase. The wireless device is then disconnected from the audio network and can be reconnected to the audio network in an operational phase. The connection in the operational phase is enabled using information provided to the wireless device during the connection phase and offers greater connectivity and access than the limited connectivity provided to the wireless device in the connection phase.

Figure 12:
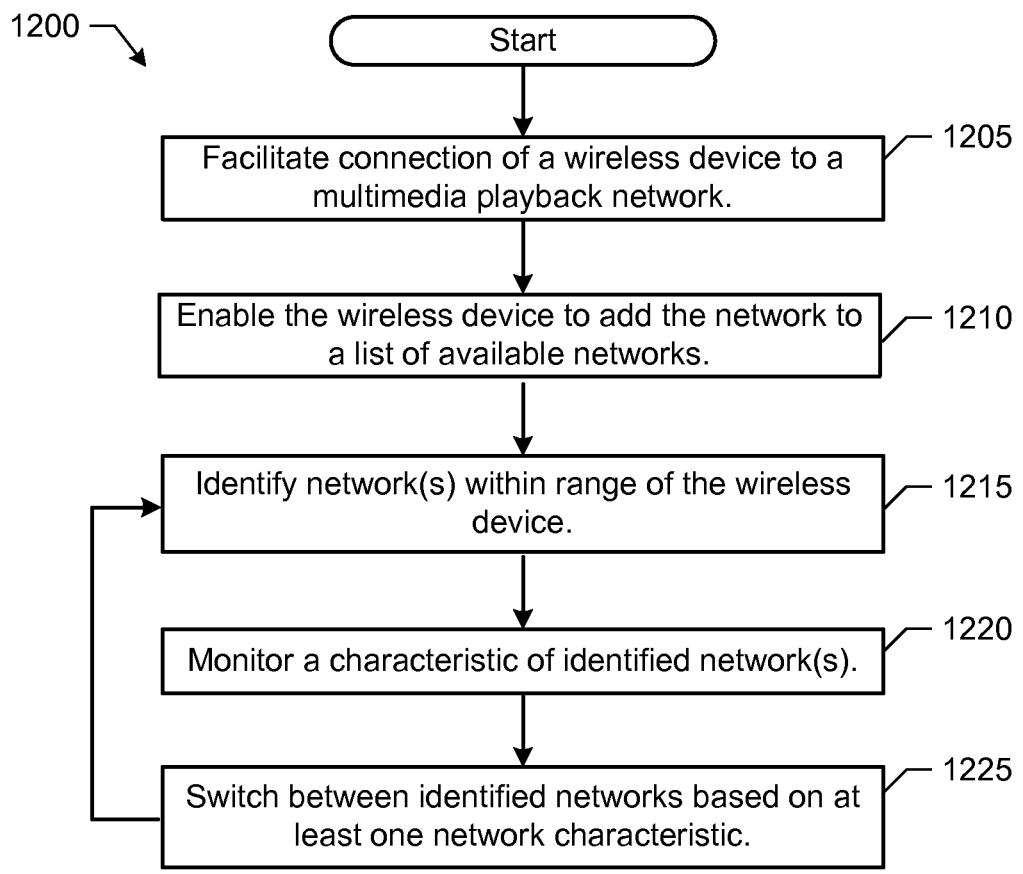
FIG. 12 illustrates a flow diagram for an example method to facilitate switching between a wireless access point and a local node to access and control a networked multimedia system.

FIG. 12 illustrates a flow diagram for an example method 1200 to facilitate switching between a wireless access point and a local node to access and control a networked multimedia system.

At block 1205, connection of a wireless device to a multimedia playback network is facilitated. For example, connection can be facilitated to a visible and/or hidden wireless network for communication, control, playback, and so on. Connection of the device to the network can be facilitated via an exchange of identifier and password information, for example.

At block 1210, the wireless device is enabled to add the multimedia playback network to a list of available networks for connection. For example, the wireless device can maintain a list of one or more networks/systems to which the device is authorized and/or otherwise configured to connect.

At block 1215, one or more available networks within range of the wireless device are identified. For example, if the user has no WiFi access point or is not within range of a local access point when a controller is first set up on a third-party device (e.g., an Android™ smartphone, tablet, or other device), the device can securely establish a network connection directly if it is within range of a playback system on one of the available networks.

At block 1220, a network characteristic, such as signal strength, of identified network(s) is monitored. For example, the wireless device can include a sensor to monitor and evaluate a received signal strength from each available wireless network.

At block 1225, an active wireless connection is actively switched between identified networks based on the at least one monitored network characteristics (e.g., signal strength, user-activity on the device, etc.) to optimize or improve user experience, playback quality, system responsiveness, and so on. In certain embodiments, if the connection transitions between networks, the wireless device transitions between the two connections and maintains control of music playback on any available networked device.

In certain embodiments, network roaming is facilitated using an application running on a wireless device that can roam between a wireless (e.g., WiFi) access point and a local zone player or other playback device node. In certain embodiments, each network has its own SSID, so the wireless device is roaming between two different networks, not just roaming and connecting to the same network when in range.

By using a controller application (e.g., a Sonos™ Controller application) on a third-party wireless device (e.g., an Android device), a user can use either 1) his or her own WiFi connection or 2) the audio playback network (e.g., SonosNet™ mesh network) to control the playback system. In certain embodiments, the phone or other wireless device can transition between the two connections and (relatively) seamlessly maintain control of music playback on any of the connected, available devices.

In certain embodiments, with a wireless (e.g., WiFi) connection, the controller application software can intentionally place the playback (e.g., SonosNet™ mesh) network second or subsequent to one or more other network connection options on a connectivity list, such that if a WiFi access point is listed first and the SonosNet™ network is second, and the user's phone is out of range of the WiFi access point, then the phone will use the SonosNet as the access point to connect for playback. Thus, a local node one player can be put on a preferred list of networks and can be used as a connection point for web surfing, etc. (e.g., data will pass through the zone player as if it is a WiFi access point).

In certain embodiments, if a user has no WiFi access point or is not within range of an access point when first setting up the controller on a third-party device (e.g., Android-based device), the phone or other device can securely establish a playback network connection directly if the user is within range of a network-connected device (e.g., using a join-household button-press with respect to a bridge, zone player, or other playback device).

In certain embodiments, a service that runs continuously in the background on the third-party device to actively managing the decision on whether to connect to the playback device (e.g., SonosNet™) or another available wireless (e.g., WiFi) network in order to improve the experience for the user as the user moves among multiple locations.

Thus, a third-party device can serve as a controller to set up and control the playback system anywhere within range of the user's playback system, making the user's wireless network, such as a home WiFi network, optional. Certain embodiments extend the WiFi range of a user's device to become a superset of the user's home WiFi coverage plus the playback mesh network. Certain embodiments extend effective wireless range automatically based on one or more criteria or parameters.

Certain embodiments provide a network for wireless playback of multimedia content at a location, such as a home. To support flexibility in connecting to and controlling the playback network, security, such as WPA2 security, is provided with the one or more playback devices, such as Sonos™ zone players, included in the network so that each playback device in a mesh network can act as a wireless access point to a third-party device, such as a smartphone, being used as a controller. Once the controller on the third-party device has joined the playback network (e.g., using a customer's WiFi network), the controller is to securely obtain a WPA2 passphrase so that the controller can automatically add the wireless playback network to the list of available networks on the controller device. The controller will then be able to use the user wireless connection or the playback network wireless network. If the control device has no existing wireless connection but is within range of a playback device, bridge, dock, and so on, a wireless device can securely join the local (e.g., household) network using the playback network directly without a separate wireless connection.

For example, in certain embodiments, the controller attempts to connect to a fictitious network with a specific SSID. This alerts the zone player and the playback network that a controller is attempting to join the household. If the user has pressed the join household button or buttons on a zone player and the zone player detects a device searching for the fictitious SSID, then the zone player makes itself visible so that the zone player shows up in the controller device's wireless (e.g., WiFi) scan. The controller now recognizes the visible playback network and attempts to connect using a special fixed password, for example. The zone player grants the connection but restricts communication to the traffic to perform the network start protocol. The network start (net-start) protocol is the protocol that the controllers use to join a household and to privately exchange network encryption keys. The controller then disconnects, and the zone player returns to its normal hidden operation. The controller reconnects to the playback device network using the obtained network key.

In certain embodiments, a background service is used to determine which wireless networks used on a controller device are on the same subnet as the playback network. In certain embodiments, the service can monitor the signal strength of the playback network and the networks identified above. The service can actively switch the wireless connection of the controller device between the playback network and the other identified networks based on signal strength and user activity on the device to improve and optimize the user experience, for example. In certain embodiments, a controller application running on a device, such as a smartphone or tablet (e.g., an Android™ smartphone or tablet), uses a device application programming interface (API) to modify (e.g., add, remove, edit, and so on) network (e.g., WiFi network) information.

Certain embodiments provide a packet transport the can be used to communicate short messages between wireless playback products. Certain embodiments provide a simplified packet transport which is used to communicate short messages between playback devices prior to the main set up of a playback device network. For example, hardware and software controllers running on third-party hardware, such as a smartphone, can use this simple packet transport to connect prior to the primary set up with the playback device network. In certain embodiments, two basic transport transports are defined: an IP broadcast base transport and an 802.11 probe request base transport, for example. In an example IP broadcast-based transport, an IP packet with the source address equal to the sender source address is provided along with a destination address equal to the IP broadcast address. A real destination address (e.g., a Sonos™ UUID) is embedded inside the message. In an example 802.11 probe request-base transport, a source MAC (Media Access Control) address is equal to the sender's own wireless MAC address, a destination MAC or destination BSSID is equal to a MAC broadcast address, and a real destination address (e.g., Sonos™ UUID) is embedded inside information elements within the probe. In an embodiment, the probe request is an identifier such as "SonosNet™ start 1.0". In certain embodiments, each transport packet has two bits indicating the transports on which the packet has already been sent. For example, bits can indicate packet has already been sent as an IP broadcast or sent as an 802.11 probe. When the zone player initiates the transmission of the packet, the zone player sends the packet twice, once using each transport (e.g., with an appropriate set syndicate the transport being used). When the controller initiates the transmission of the packet, the controller sends the packet one using IP broadcast (e.g., with appropriate bit set). In certain embodiments, however, the controller sends the packet twice. When the net start application on the zone player receives a net start packet, it retransmits the packet on any transports that have not previously been used, setting the appropriate bits to indicate the transport. Thus, each zone player receiving a net start packet as a probe request forwards it once as an IP broadcast on the playback mesh network, and each zone player receiving a packet as an IP broadcast submits it once as a probe request.

In certain embodiments, a plurality of netstart protocol messages can be used to facilitate the netstart protocol for a new device, such as a controller (CR), connecting to the network. For example, messages can include:

| Message Name | Direction | Purpose |
| --- | --- | --- |
| R_NS_ALIVE_UNICAST_REQUEST | CR to "world" | (optional) A broken CR that is unable to receive IP broadcasts tells all ZPs to send their R_NS_ALIVE messages as unicasts to its IP address |
| R_NS_ALIVE | ZP to "world" (or unicast-see above) | Announces a ZP's presence when the user pushes mute + volume up |
| R_NS_QUERY | CR to ZP | A CR tells the ZP its RSA public key, and asks the ZP for its own RSA public key, home channel, HouseholdID (≈SSID), and AES key |
| R_NS_RESPONSE | ZP to CR | A ZP responds with its own RSA public key, home channel, HouseholdID, and AES key (the latter three will be "blank" in a "factory reset" state, and will be encrypted using the CR's RSA public key) |
| R_NS_ASSESS_CHANS | CR to ZP | A CR asks a ZP to examine each of its possible channels and report the best one |
| R_NS_RESPOND_CHANS | ZP to CR | A ZP responds with its assessment of which channel is best |
| R_NS_SET | CR to ZP | A CR tells a ZP what channel, HouseholdID, and AES key to use (encrypted with ZP's RSA public key) |
| R_NS_ACK | ZP to CR | A ZP responds, acknowledging that it obeyed the instructions specified in the R_NS_SET |
| R_NS_REVERTCHAN | CR to ZP | A CR tells a ZP that the NetStart protocol is complete and the ZP should revert to its "home" channel |
| R_NS_GETCHAN | CR to ZP | A CR asks a ZP what channel the household is using (used by the UI for setting the channel; NOT used at all during setup) |
| R_NS_RESP_GETCHAN | ZP to CR | A ZP responds to the CR telling it the channel number (used by the UI for setting the channel; NOT used at all during setup) |
| R_NS_SETCHAN | CR to ZP | A CR tells all ZPs in a household what channel to use (used by the UI for setting the channel; NOT used at all during setup) |

In certain embodiments, an example sequence between a factory reset CR and a factory reset ZP can be illustrated according to the messages above as:
1. R_NS_ALIVE_UNICAST_REQUEST (from CR to any listening ZP)
2. R_NS_ALIVE (from ZP so that CR and ZP find one another)
3. R_NS_QUERY (from CR to ZP)
4. R_NS_RESPONSE (CR asks ZP for its RSA public key+network parameters—which come back blank because the ZP is factory reset)
5. R_NS_ASSESS_CHANS (CR asks ZP to perform a channel assessment
6. R_NS_RESPOND_CHANS (and ZP responds with an assessment of a best channel for communication)
7. R_NS_SET (CR generates a new HouseholdID and AES key, and programs it into the ZP, along with the channel determined during R_NS_ASSESS_CHANS)
8. R_NS_ACK (ZP responds in acknowledgement)

In certain embodiments, an example sequence between a factory reset CR and a non-factory reset ZP can be illustrated according to the messages above as:
1. R_NS_ALIVE_UNICAST_REQUEST
2. R_NS_ALIVE (CR and ZP find one another)
3. R_NS_QUERY
4. R_NS_RESPONSE (CR asks ZP for its RSA public key+network parameters—which come back populated)
5. R_NS_REVERTCHAN (CR locally applies network parameters and instructs the ZP to return to its home channel immediately)

In certain embodiments, an example sequence when using a CR to add a ZP to an existing household can be illustrated according to the messages above as:
1. R_NS_ALIVE_UNICAST_REQUEST
2. R_NS_ALIVE (CR and new ZP find one another)
3. R_NS_QUERY
4. R_NS_RESPONSE (CR asks its associated ZP for the network parameters)
5. R_NS_QUERY
6. R_NS_RESPONSE (CR gets the RSA public key of the new ZP, ignoring all other network parameters)
7. R_NS_SET
8. R_NS_ACK (CR programs the channel, HouseholdID, and AES key into the new ZP)

In certain embodiments, the user presses one or more buttons on a zone player to connect to a wireless playback network. The zone player cycles between each of a number of possible channels (e.g., three possible channels). The zone player sends alive messages on each of the possible channels and then waits a short time for a response. The controller sits on one channel listing for the alive messages. When the controller hears an alive message, the controller sends the originating zone player a query. Upon receipt of the query, the zone player halts its cycling between channels. The remaining netstart handshake takes place on the channel on which the zone player landed when contacted by the controller. At the end of the sequence, when the zone player receives a network set message, the zone player switches to a specified channel. Alternatively, when the zone player receives a revert channel message, the zone player returns to its "home" channel.

In certain embodiments, when the user presses one or buttons on the zone player, the zone player cycles between each of a number of possible channels (e.g., three possible channels) sending alive messages and then waiting a short time for a response. The controller sends and receives IP broadcasts. A new wireless zone player communicates with the controller by relying on the net start behavior of forwarding receive net start 802.11 probe requests onto the playback network as IP broadcasts and of forwarding received IP broadcast from the playback network as 802.11 probe requests. When zone player receives a netstart set message, the zone player switches to the specified channel. Alternatively, when zone player receives a revert channel message, the zone player returns to its home channel.

In certain embodiments, the controller uses a wireless chip, such as an AR6002 wireless chip, which has a hardcoded firmware implementation of an 802.11g client. This firmware can, for example, probe for access points on a specified list of channels and report back content of information elements from their beacons and probe responses. The firmware can also, for example, associate with the specified access point, such as an SSID, a BSSID, an advanced encryption standard (AES) key, and so on. Netstart can be built on top of this firmware capability such that when the user presses buttons on the zone player to connect to the network, the zone player still cycles between each of the available channels sending and allied message and then waiting a short time for response. While the zone player is cycling between the available channels, the zone player also includes a special information element in its probe responses indicating that the zone player is in net start mode. The controller continuously scans for access points, cycling between the possible channels at a rate faster than the zone player and sending probes which include a special information element indicating that the controller is searching for zone player. If a zone player in net start mode receives a broadcast probe from a controller searching for a zone player, as identified by the special information element, the zone player aborts channel scanning and respond to the broadcast probe. The controller looks at the scan results for an access point with the special information element. If it finds such an access point, the zone player associates with the access point without security. The special "no security" association currently allows a controller and the playback network to exchange MAC broadcast frames. In certain embodiments, the security is tightened to allow the controller and the zone player to exchange net start broadcasts only. That is, only MAC broadcasts that are also IP broadcasts including, for example, a UDP datagram with destination port 6969 can be exchanged. The stricter filter makes the "no security" association more limited and, hence, less of a security risk. In certain embodiments, if the zone player is factory reset and does not have a household ID, the zone player uses an SSID of a generic form for the temporary association. In certain embodiments, there is a special "safe association" mode for manufacturing test used with zone player that includes an extra MAC address of the one and only controller committed to associate in its beacons and probe responses.

Once an association relationship is established between the controller and the zone player, the net start handshake occurs via IP broadcast. Once the controller identifies the network AES key, the controller drops is insecure Association with the zone player and re-creates the association securely using the AES key with full permission access the playback network.

In certain embodiments, a more constrained version of controller implementation is provided. For example, the controller cannot set or detect arbitrary information elements in probe requests or probe responses. Some controller devices, such as smartphones, cannot see an access point that is not sending beacons these phones are able to associate to zone players that are not sending beacons, for example. In order to do this, the zone players made to look like a standard out access point during household discovery by the controller device. When the user hits the buttons on the zone player connected to a network, the zone player tells the wireless driver to drop all probes and association requests from third-party devices in addition to doing channel scanning and waiting for the life message. The controller, such as a smart phone, attends to connect to a network with SSID set to net start which causes the device to send targeted probes for that SSID in addition to broadcast all probes. When the wireless driver on the zone player sees the targeted probes for net start, the zone player signals a net start via a net link. In certain embodiments, the zone player does not respond to the probe. Net start then switches to the quote home quote channel to help ensure that there is a path for DHCP traffic and enables a wireless driver to respond to broadcast and targeted probes to the normal SSID. Additionally, net start starts sending beacons with the SSID in them. The wireless device sees an IP with that SSID starting with a household ID number and assumes that the device is a zone player. The wireless device then attempts WPA2 authentication with a password that is only valid during net start mode on the zone player. The zone player allows the controller device to associate with the network and provides limited network, tip conductivity privacy (e.g., enough for DHCP and net start). The controller device does it conducts the IP-based net start protocol described above to join the household. The wireless controller device uses information obtained from the zone player to set up a correct network configuration (e.g., SSID and permanent WPA2 passphrase).

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

We claim:

1. A method to connect a wireless device to a multimedia playback network, the method comprising:
   identifying a first network within range of the wireless device to connect the wireless device to the multimedia playback network for playback of media content, the multimedia playback network configured separately from the first network and arranged for playback of media content via at least one playback device;
   initiating, by the wireless device, connection of the wireless device to the first network;
   adding the first network to a list of a plurality of networks for connection by the wireless device, the list of networks including at least a) a first connection to a wireless access point with network access to connect the wireless device to the multimedia playback network and b) a second connection to a playback device connected to the multimedia playback network;
   monitoring, via the wireless device, one or more available networks from the list of networks that are within range of the wireless device;
   evaluating, via the wireless device, the one or more available networks to identify a preferred network for connection of the wireless device to the multimedia playback network based on at least one network characteristic; and
   facilitating a switch of the wireless device to from the first network to the preferred network to connect the wireless device to the multimedia playback network if the preferred network is different from the first network.

2. The method of claim 1, wherein the wireless device comprises a controller for one or more networked playback devices.

3. The method of claim 2, wherein the controller is a smartphone running a controller application.

4. The method of claim 1, wherein the playback device connection is prioritized below the wireless access point connection in the list of networks for the wireless device.

5. The method of claim 1, wherein the at least one network characteristic includes signal strength.

6. The method of claim 5, wherein facilitating further comprises actively switching a wireless network connection for the wireless device between the playback device connection and the wireless access point connection based on monitored signal strength and user activity on the wireless device.

7. The method of claim 1, wherein monitoring, evaluating, and facilitating are enabled by a service executing in a background on the wireless device to actively manage network connection decisions.

8. The method of claim 1, further comprising maintaining control of music playback via the wireless device when the wireless device switches between two network connections.

9. A computer readable storage device or storage disc including instructions for execution by a processor, the instructions, when executed, cause the processor to implement a method to connect a wireless device to a multimedia playback network, the method comprising:
   identifying a first network within range of the wireless device to connect the wireless device to the multimedia playback network for playback of media content, the multimedia playback network configured separately from the first network and arranged for playback of media content via at least one playback device;
   initiating, by the wireless device, connection of the wireless device to the first network;
   adding the first network to a list of a plurality of networks for connection by the wireless device, the list of networks including at least a) a first connection to a wireless access point with network access to connect the wireless device to the multimedia playback network and b) a second connection to a playback device connected to the multimedia playback network;
   monitoring, via the wireless device, one or more available networks from the list of networks that are within range of the wireless device;
   evaluating, via the wireless device, the one or more available networks to identify a preferred network for connection of the wireless device to the multimedia playback network based on at least one network characteristic; and
   facilitating a switch of the wireless device to from the first network to the preferred network to connect the wireless device to the multimedia playback network if the preferred network is different from the first network.

10. The storage device or storage disc of claim 9, wherein the wireless device comprises a controller for one or more networked playback devices.

11. The storage device or storage disc of claim 10, wherein the controller is a smartphone running a controller application.

12. The storage device or storage disc of claim 9, wherein the playback device connection is prioritized below the wireless access point connection in the list of networks for the wireless device.

13. The storage device or storage disc of claim 9, wherein the at least one network characteristic includes signal strength.

14. The storage device or storage disc of claim 9, further comprising maintaining control of music playback via the wireless device when the wireless device switches between two network connections.

15. A wireless device comprising:
a wireless communication interface to identify a first network within range of the wireless device available to connect the wireless device to a multimedia playback network for playback of media content and to facilitate connection of the wireless device to the first network, the multimedia playback network configured separately from the first network and arranged for playback of media content via at least one playback device;
a processor to add the first network to a registry of networks for connection by the wireless device, the registry of networks including at least a) a first connection to a wireless access point with network access to connect the wireless device to the multimedia playback network and b) a second connection to a playback device connected to the playback network; and
a signal strength monitor to monitor one or more available networks from the registry of networks that are within range of the wireless device,
wherein the processor is to evaluate the one or more available networks to identify a preferred network for connection based on at least one network characteristic and facilitate a switch of the wireless device from the first network to the preferred network to connect the wireless device to the multimedia playback network if the preferred network is different from the first network.

16. The system of claim 15, wherein the wireless device comprises a controller for one or more networked playback devices.

17. The system of claim 16, wherein the controller is a smartphone running a controller application.

18. The system of claim 15, wherein the playback device connection is prioritized below the wireless access point connection in the list of networks for the wireless device.

19. The system of claim 15, wherein the at least one network characteristic includes signal strength.

20. The system of claim 19, wherein the processor is to actively switch the wireless network connection for the wireless device between the playback device connection and the wireless access point connection based on monitored signal strength and user activity on the wireless device.

21. The system of claim 15, wherein the processor is to maintain control of music playback via the wireless device when the wireless device switches between two network connections.

* * * * *